United States Patent [19]

Reynolds et al.

[11] Patent Number: 4,998,813

[45] Date of Patent: Mar. 12, 1991

[54] MIRROR SYSTEM FOR PASSENGER BUSES

[76] Inventors: Philip A. Reynolds, P.O. Box 139, Hide-A-Way Hills, Ohio 43107; Frank E. Reynolds, 19767 S.R. 4, Marysville, Ohio 43040

[21] Appl. No.: 228,072

[22] Filed: Aug. 4, 1988

[51] Int. Cl.$^5$ .................... G60R 1/04; G02B 7/18
[52] U.S. Cl. .................... 350/624; 350/632; 248/479
[58] Field of Search ............ 350/618, 619, 623, 624, 350/631, 632; 248/481, 479

[56] References Cited

U.S. PATENT DOCUMENTS

| | | | |
|---|---|---|---|
| 3,901,587 | 8/1975 | Haile | 350/632 |
| 4,436,372 | 3/1984 | Schmidt | 350/293 |
| 4,549,790 | 10/1985 | Harris, Jr. | 350/632 |
| 4,687,305 | 8/1987 | Harris, Jr. et al. | 350/632 |
| 4,730,914 | 3/1988 | Stout | 350/629 |

FOREIGN PATENT DOCUMENTS

| | | | |
|---|---|---|---|
| 3108626 | 6/1982 | Fed. Rep. of Germany | 350/631 |
| 3125701 | 3/1983 | Fed. Rep. of Germany | 350/631 |
| 0142738 | 12/1978 | Japan | 350/631 |
| 0964559 | 10/1982 | U.S.S.R. | 350/631 |

Primary Examiner—Bruce Y. Arnold
Assistant Examiner—R. D. Shafer
Attorney, Agent, or Firm—Biebel, French & Nauman

[57] ABSTRACT

A mirror system for passenger buses is provided for use in conjunction with rear mounted diesel engine buses. This mirror system includes a vibration damped mirror assembly and a mirror bracket assembly. The mirror assembly includes an acrylic convex mirror, a fiberglass backing member and a gasket for coupling the mirror to the backing member. The bracket assembly includes a horizontal rail member which extends from a handrail mounting member to one on the opposite side of the bus, three vertically depending bars and a horizontal stabilizing member which connects the bottom ends of the vertically depending bars.

19 Claims, 2 Drawing Sheets

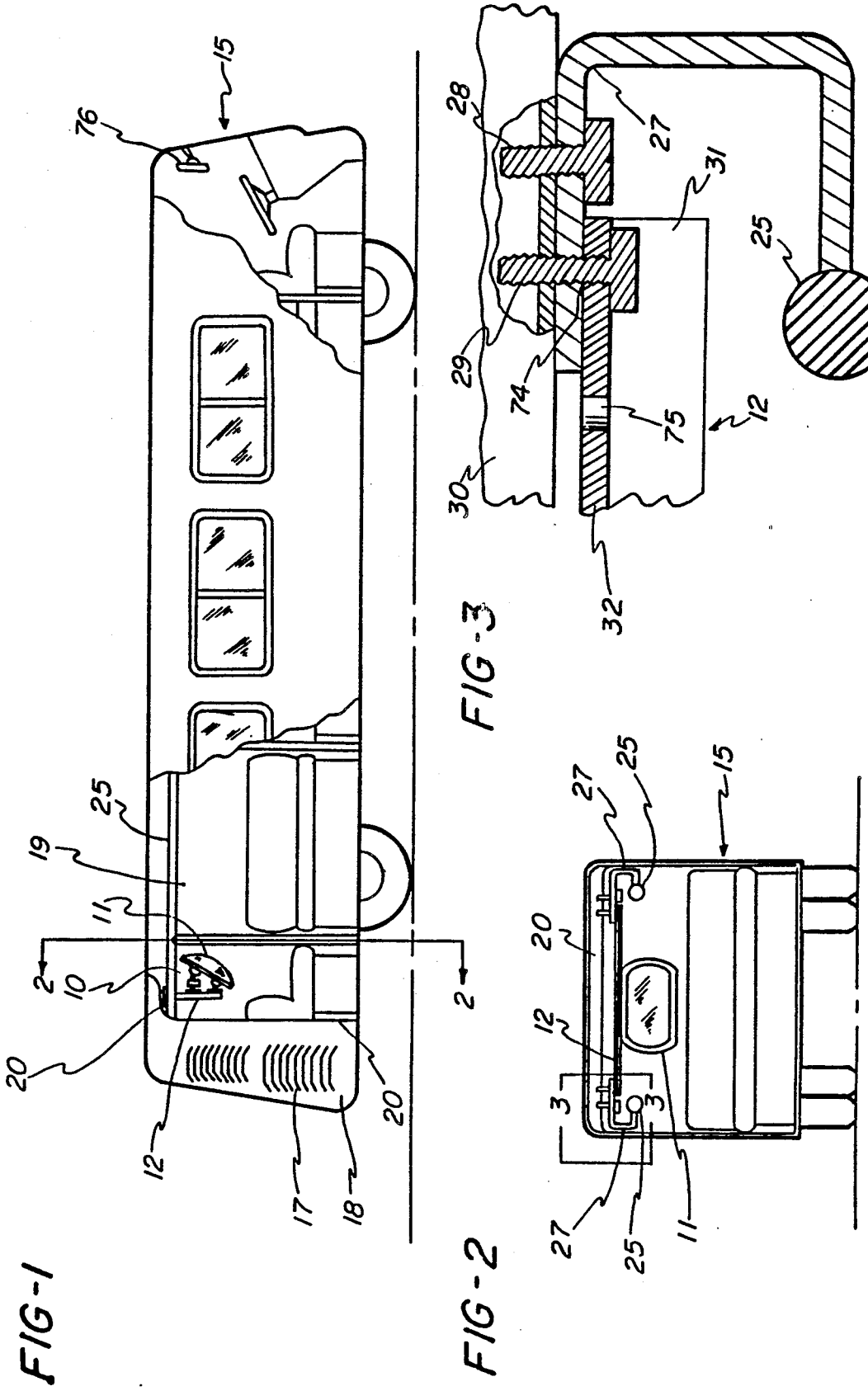

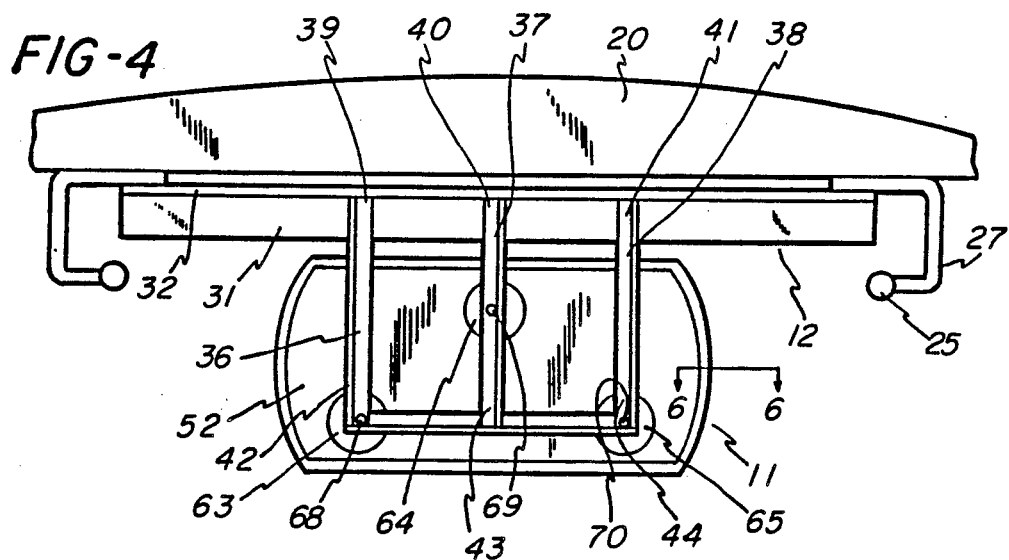
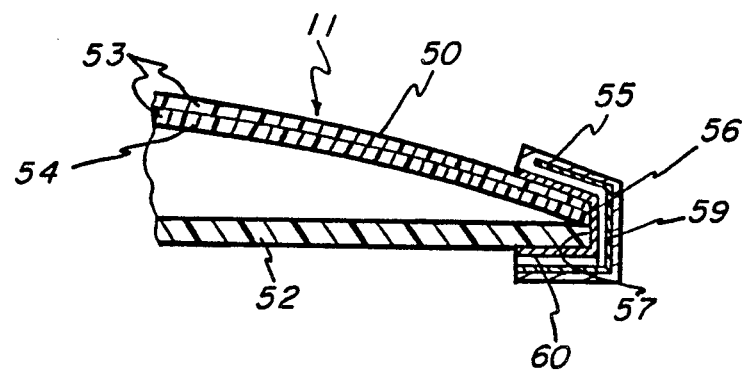
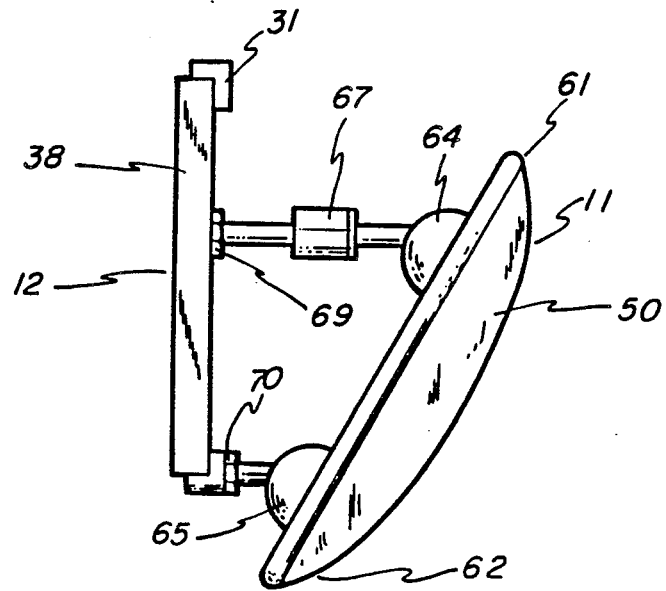

MIRROR SYSTEM FOR PASSENGER BUSES

BACKGROUND OF THE INVENTION

This invention relates generally to a mirror system and, more particularly, to one for use in passenger buses having rear mounted diesel engines.

This invention is directed to providing a suitable mirror system designed to be utilized in passenger buses having rear mounted diesel engines. Although this system has preferably been designed for use in the type of buses used in municipal transportation systems, its use could extend to interstate common carriers, or bus coaches having highback seats.

Bus companies expend a considerable amount of money removing graffiti or replacing seat covers destroyed through acts of passenger vandalism. A great amount of passenger vandalism occurs in the rear half of the bus, since individuals seated or standing at the rear of the bus tend to more easily disregard the presence of and admonitions by the bus driver.

While rear mounted mirror systems exist for use in school buses, two problems are present in rear mounted diesel engine buses which render the use of those types of mirror systems impractical. The first problem is that diesel powered buses emit a low speed harmonic vibration that is not found in the gasoline motors normally used to power school buses. The second problem with typical rear mounted diesel engine buses is that they make use of a polypropylene liner between the engine and passenger compartments. While this liner reduces the levels of noise and diesel fumes which enter the passenger compartment, it does not possess suitable structural strength by which a mirror system can be secured to it, as similar mirror systems are secured to the metallic roofs of school buses.

Even if a mirror system could be mounted at the back of a rear mounted diesel engine bus, the types of mirrors found in school buses vibrate excessively, such that a bus driver is unable, especially at idle or low speeds, to ascertain whether there are any acts of vandalism occurring.

Prior attempts at viewing passengers in the back of rear mounted diesel engine buses have thus met with limited success. It is not uncommon to find the most rearwardly mounted mirror in diesel buses in the central stairwell. This small planar or convex mirror has as its primary purpose, the enabling of the driver to ascertain whether the stairwell exit is clear of departing passengers, as well as prevent its use as an unauthorized entrance to the bus. However, since some of such stairwell mirrors reflect slightly rearward of the stairwell itself, a limited view of the frontal portions of passengers seated at the rear of the bus may be permitted. This limited view is normally only of the individuals' faces, such that their hands are concealed by the seatbacks. Therefore, prior mirror systems are not intended and do not serve to prevent vandalism in the form of graffiti or in the form of mutilation of the seat covers from occurring.

Thus, previously known mirror systems for buses have not been found adequate for use in passenger buses having rear mounted diesel engines. Therefore, it is apparent that the need exists for an improvement in mirror systems. Additionally, from a structural standpoint, the improvement must be compatible with modern passenger bus or passenger coach design.

SUMMARY OF THE INVENTION

In accordance with this invention, a mirror system for passenger buses is provided for advantageous use with buses having rear mounted diesel engines. The mirror system includes a vibration damped mirror assembly having a mirror bracket assembly mounted to the support structure of the overhead handrail system. The mirror assembly includes a relatively large acrylic convex mirror, having a fiberglass backing member and a gasket for coupling the mirror to the backing member. A plurality of pedestal mounts serve to interconnect the backing member to the bracket assembly.

The bracket assembly includes a horizontal rail member which extends across the rear of the bus from one handrail mounting member to the one on the opposite side of the bus, three vertically depending bars which extend downwardly from the horizontal rail member, and a horizontal stabilizing member which connects the bottom ends of the vertical bars.

The primary objective of this invention is to provide a mirror system for passenger buses having rear mounted diesel engines which will permit almost vibration-free viewing of the activities of passengers in the rear of the bus; to provide a mirror system for passenger buses which can be mounted in the rearward part thereof to provide a mirror which does not pose a safety threat; and to provide a mirror which is relatively vandal proof itself.

Other objects and advantages of the invention will be apparent from the following description, the accompanying drawings and the appended claims.

BRIEF DESCRIPTION OF THE INVENTION

FIG. 1 is a side plan view and shown partly in section of a passenger bus with a rear mounted diesel engine provided with an embodiment of the mirror assembly of this invention.

FIG. 2 is a vertical sectional view taken along line 2—2 of FIG. 1.

FIG. 3 is a rear elevational view on a greatly enlarged scale of the portion of the bracket assembly within the encircled line 3—3 of FIG. 2.

FIG. 4 is a rear elevational view on an enlarged scale and shown partly in section of the mirror system shown in FIG. 2.

FIG. 5 is a horizontal sectional view on a greatly enlarged scale taken along line 5—5 of FIG. 4.

FIG. 6 is a side elevational view on an enlarged scale of the mirror system shown in FIG. 1.

DETAILED DESCRIPTION OF THE INVENTION

Having reference to the drawings, attention is directed first to FIG. 1 which illustrates a mirror system embodying this invention installed in operative relationship with respect to a passenger bus having a rear mounted diesel engine. The mirror system is designed generally by the numeral 10. The mirror system of this invention has as its two primary components, a mirror assembly 11 and bracket assembly 12.

As can be seen by reference to FIGS. 1 and 2, the passenger bus 15 has a rear mounted diesel engine 17. Buses of this type are commonly used by cities as part of their municipal bus systems, by companies engaged in the chartering of buses, and by companies engaged in interstate transportation of passengers. Separating the engine compartment 18 from the passenger compartment 19 is a liner 20.

The liner serves at least three functions. First, it reduces the introduction of diesel omissions into the passenger compartment. Second, it reduces the accompanying diesel noise level found in the passenger compartment. Third, it provides the interior of the bus with a wall surface. These rear liners are normally fabricated from plastic, with the majority of them being polypropylene. However, the polypropylene liner does not in and of itself possess sufficient structural integrity to enable it to support the direct securing thereto of a rear mounted mirror.

Across the upper portion of the passenger compartment 19, runs handrail 25 with this handrail being supported by a handrail mounting member 27. Having reference to FIGS. 3 and 4, the handrail mounting member 27 is secured by outer and inwardly positioned screws 28 and 29, respectively, into bus frame 30. The mirror system disclosed by this invention has its horizontal rail member 31 secured by screw 29 into frame 30. The horizontal rail member 31 has a rearwardly projecting flange 32.

Depending downwardly from horizontal rail member 31 are a plurality of vertical bars 36, 37 and 38. In the preferred embodiment, center bar 37 is 8" from both of the other two bars. Each of such bars have their top ends 39, 40 and 41 secured to horizontal rail member 31 by suitable means. Additionally, each of such parallel vertical bars have their bottom ends 42, 43 and 44 respectively, secured to a horizontal stabilizing member 45. The means of securing these bars together preferably is by welding of the electric welded type E70. In the preferred embodiment, bars 36, 37 and 38 run perpendicular to horizontal rail member 31 and horizontal stabilizing member 45. Thus configured, it has been found that the vibration of the mirror caused by harmonic vibration has been greatly reduced. Additionally, horizontal rail member 31, vertical bars 36, 37 and 38 and horizontal stabilizing member 45 are preferably fabricated from steel angle iron of A36 steel, 1"×1"×3/16". The bracket assembly, as shown in the drawings, has all of its edges and welds dressed and rounded for occupant safety and coated with at lease one coat of rust kill primer.

The mirror assembly, as can best be seen in FIGS. 5 and 6, features a vibration damped mirror assembly having a ¼" acrylic convex mirror 50 and a ⅛" fiberglass backing member 52 in the preferred embodiment thereof. The acrylic convex mirror is a second surface acrylic lens having reflective material 53 and plexiglas sheet 54. The sheet of reflective material is positioned behind the plexiglas, so in case of scratching on the face of the mirror by vandals, the scratching will not distort the image and the mirror can be cleaned up with a polishing compound. A molded U-shaped cross section member gasket goes around the circumference of the mirror and serves as a means for coupling the mirror to the backing member at the edges thereof. Preferably the gasket is fabricated from neoprene As can best be seen in FIG. 5, the rubber or plastic gasket 55 includes reinforcing means 59 preferably of a metal, such as steel, to provide for the extremely secure attachment about mirror edge 56 and backing member edge 57. Still further, an adhesive 60 is layered between the gasket and mirror and backing member. The composition of the neoprene gasket and adhesive layer further serve to reduce vibration. The result of this invention is that the vibrational frequency of the mirror system has been placed outside the normal operating range of the bus.

The mirror assembly is approximately one and one-half times wide as it is high, with preferable dimensions being on the order of 24"×16". Additionally, the mirror assembly has top and bottom edges 61 and 62, respectively. As shown, the preferred embodiment has the top edge 61 positioned below the horizontal rail member 31, and the bottom edge 62 positioned below horizontal stabilizing member 45. The mirror assembly also includes a plurality of pedestal mounting members 63, 64 and 65 respectively, which secure the fiberglass backing member 52 to the bracket assembly 12. These pedestal mounting members are conventional pedestal mounts used with mirrors, except that the central pedestal mounting member 64 features an extension shaft 67 so as to permit the forward inclination of the mirror assembly.

Pedestal fastening means 68, 69 and 70 respectively, are secured to pedestal 63, 64 and 65. Pedestal 64 is secured near the midpoint of vertical bar 37, while pedestals 63 and 65 are secured to stabilizing bar 45. One further feature of the bracket assembly of this device is that it comes with a plurality of longitudinally aligned apertures 74 and 75 in the rearwardly projecting flange 32 of horizontal rail member 31. These apertures permit the mirror system to be utilized in buses having various widths between their opposing handrail mounting members 27.

In actual operation, the centrally located screws 29 are removed from their existing mounting points on opposing handrail mounting members 27. The correct aperture 74 or 75 on the rearwardly projecting flange 32 is aligned with the hole in the handrail mounting member 27 and the screw 29 is then reinserted and secured such that one end of the bracket assembly is secured into the bus frame 30. The process is repeated for the other end of horizontal rail member 31 until both ends of the bracket assembly are secured into the frame. If either of the end portions of the horizontal rail member are interfered with by the outwardly oriented screws 28, that interfering portion may be cut off by the use of a hack saw. When installed in its operative position, the mirror system is suspended above the center aisle of the bus.

It will be readily apparent, from the foregoing detailed description of illustrative embodiments of this invention, that a particularly novel and extremely effective mirror system for use on passenger buses having rear mounted diesel engines is provided. The mirror system is relatively simple to fabricate and requires a minimal amount of time for installation at the rear of passenger buses. It permits the easy observation of the activities of passengers in the rear interior of the bus merely by looking into a conventional mounted rear view mirror 76.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a mirror system for passenger buses of the type including a rear mounted convex mirror for permitting the driver to observe the activities of passengers in the rear of the bus merely by looking into a conventionally mounted rear view mirror, the improvement comprising:
a vibration damped mirror assembly and a mirror bracket assembly mounted directly to the support structure of the overhead handrail system of the bus,
said mirror assembly comprising:
an acrylic convex mirror,
a fiberglass backing member,
a gasket for coupling the mirror to the backing member at the edges thereof, and
a plurality of pedestals mounted on said backing member for connecting the mirror assembly to the bracket assembly,
said bracket assembly including:
a horizontal rail member extending across the rear of the bus from a handrail mounting member on one side to the handrail mounting member on the other side,
three vertical bars extending downwardly from said horizontal rail member, said vertical bars being connected to the pedestals, and
a horizontal stabilizing member connecting the bottom ends of said vertical bars.

2. A mirror system according to claim 1, wherein said vertical bars extend perpendicularly from said horizontal rail member.

3. A mirror system according to claim 1, wherein said horizontal rail member has a rearwardly extending flange.

4. A mirror system according to claim 3, wherein said rearwardly extending flange has a plurality of longitudinally aligned apertures.

5. A mirror system according to claim 4, wherein between said gasket and said mirror and backing member is an adhesive layer.

6. A mirror system according to claim 5, wherein said gasket contains reinforcing means.

7. A mirror system according to claim 3, wherein said mirror assembly is approximately one and one-half times as wide as it is high.

8. A mirror system according to claim 1, wherein said acrylic convex mirror is approximately ¼" thick.

9. A mirror system according to claim 8, wherein said fiberglass backing member is approximately ⅛" thick.

10. A mirror system according to claim 1, wherein said mirror assembly has a top edge, said top edge located below said horizontal rail.

11. A mirror system according to claim 10, wherein said mirror assembly has a bottom edge, said bottom edge located below said horizontal stabilizing member.

12. A mirror system according to claim 8, wherein said acrylic convex mirror is a second surface lens comprising a sheet of reflective material and a sheet of plexiglas.

13. A mirror system according to claim 1, wherein said passenger buses are of the rear engine mounted diesel type with a liner between the engine and the passenger compartment.

14. A mirror system for passenger buses of the type including a rear mounted mirror for permitting observation of passengers in the rear of the bus, said mirror system having means extending across the rear of said bus for supporting a vibration clamped mirror assembly thereon and having means permitting said mirror assembly to experience minor vibration by placing its vibrational frequency outside the normal operating range of said bus, said mirror assembly including a convex mirror, a fiberglass backing member, means for coupling said mirror to said backing member at the ends thereof, and a plurality of pedestals mounted on said backing member for connecting said mirror assembly to said bracket assembly.

15. A mirror system according to claim 14, wherein said means extending across the rear of said bus is secured directly to the frame of said bus.

16. A mirror system according to claim 14, wherein said mirror assembly is suspended above the aisle of said bus.

17. A mirror system for rear engine mounted diesel passenger buses of the type including a mirror mounted in the rear of a bus which permits the driver to observe the rear interior of the bus by looking into a conventionally mounted rear view mirror, said mirror system comprising a vibration damped mirror assembly, and a mirror bracket assembly mounted directly to the frame of said bus, said bracket assembly including a horizontal rail member extending across the rear of the bus and mounted to said frame, and a plurality of bars extending downwardly from said horizontal rail member.

18. A mirror system according to claim 15, wherein said mirror assembly is suspended above the aisle of said bus.

19. A mirror system according to claim 15, wherein said mirror assembly includes a convex mirror, a fiberglass backing member, means for coupling said mirror to said backing member at the edges thereof, and a plurality of pedestals mounted on said backing member for connecting said mirror assembly to said bracket assembly.

* * * * *